United States Patent [19]

Lindqvist

[11] Patent Number: 4,541,793

[45] Date of Patent: Sep. 17, 1985

[54] EXTRUDER NOZZLE AND A METHOD FOR PRODUCING PLASTIC PRODUCTS

[75] Inventor: Sven Lindqvist, Stenungsund, Sweden

[73] Assignee: Marie Iacconi, Switzerland

[21] Appl. No.: 500,541

[22] Filed: Jun. 2, 1983

[30] Foreign Application Priority Data

Jun. 4, 1982 [SE] Sweden ............... 8203463

[51] Int. Cl.$^4$ ............................................. B29F 3/06
[52] U.S. Cl. ....................... 425/206; 264/209.2; 425/207; 425/326.1; 425/376 B; 425/381; 425/466; 425/467
[58] Field of Search ............. 264/209.2, 503, 312, 264/209.8; 425/381, 326.1, 144, 376 B, 376 A, 206–207, 465–467

[56] References Cited

U.S. PATENT DOCUMENTS

| | | | |
|---|---|---|---|
| 2,043,682 | 6/1936 | Walter | 425/381 |
| 3,024,494 | 3/1962 | Szpila | 425/466 |
| 3,059,277 | 10/1962 | Pierce et al. | 425/376 B |
| 3,122,788 | 3/1964 | Lieberman | 425/206 |
| 3,149,377 | 9/1964 | Morse | 425/207 |
| 3,193,879 | 7/1965 | Corbett | 425/466 |
| 3,279,501 | 10/1966 | Donald | 138/118 |
| 3,281,897 | 11/1966 | Mercer | 425/381 |
| 3,296,343 | 1/1967 | Buttolph et al. | 264/209.2 |
| 3,400,428 | 9/1968 | Barainsky | 425/376 A |
| 3,540,078 | 11/1970 | Schultz | 264/176 |
| 3,590,432 | 7/1971 | Schott, Jr. et al. | 425/376 B |
| 4,151,242 | 4/1979 | Sansone | 264/209.2 |

FOREIGN PATENT DOCUMENTS

| | | | |
|---|---|---|---|
| 2024825 | 11/1970 | Fed. Rep. of Germany | 425/206 |
| 1729316 | 3/1971 | Fed. Rep. of Germany | . |
| 2537912 | 3/1977 | Fed. Rep. of Germany | 425/207 |
| 2054726 | 5/1971 | France | 425/467 |
| 46-35988 | 10/1971 | Japan | 425/381 |
| 558251 | 1/1975 | Switzerland | 425/207 |

*Primary Examiner*—Jeffery Thurlow
*Attorney, Agent, or Firm*—Cantor and Lessler

[57] ABSTRACT

In order to homogenize and to obtain a uniform temperature distribution in a plastics substance, which is to be extruded between an inner and an outer component, in a nozzle, the substance is made to pass a bearing structure comprising a number of rolling bearings, where the balls serve as kneading bodies. The inner and the outer components of the orifice rotate in opposite directions, which will orientate the molecular chains in the surface zones of the extruded products at an angle to the direction of extrusion. In this manner the structure of the product is enhanced, while simultaneously the kneading operation reduces the risk of impurities in the plastics compound causing weak spots in the product.

7 Claims, 3 Drawing Figures

EXTRUDER NOZZLE AND A METHOD FOR PRODUCING PLASTIC PRODUCTS

BACKGROUND OF THE INVENTION

When manufacturing plastics products in the form of tubes certain problems are encountered concerning the strength of the material. One difficulty is to maintain an even temperature in the plastics substance. Even small differences in the temperature result in changes in the flowability. A locally increased temperature brings about a more rapid flow which means that a relatively bigger volume of material will pass out through the adjacent portion of the nozzle.

Furthermore deposits will often form in the nozzle, which will cause lines in the extruded products, so called dieliners. The risk of such die-liners is reduced, while simultaneously the temperature distribution in the substance will be uniform, if the substance is thoroughly worked just before the clearance of the nozzle.

The elongate molecular chains in the substance will, during the extrusion through the clearance, be oriented in the direction of flow, which, together with the tendencies to local temperature variations and possible dieliners, may result in weak spots in the ready products, which are especially marked if a tubular preform is expanded to foil thickness.

The aim of the present invention is to propose a method and an extruder nozzle for producing plastics products by extrusion of a plastics substance through a clearance opening between an inner component and an outer component.

SUMMARY OF THE INVENTION

A method according the invention is characterized in supporting the outer component in relation to the inner component by means of a bearing structure comprising a number of rolling bearings, arranged axially behind each other, and directing the flow of plastics substance so it, on its way to the clearance opening, is made to pass at least some of the rolling bearings forming part of the bearings structure, while simultaneously rotating the inner and the outer components in opposite directions.

An extruder nozzle for producing a tubular product is characterized in that the inner component is mounted at one end of a shaft, and that the outer component is mounted at a tubular casing, enclosing the shaft with an annular allowance, in which a bearing structure comprising a number of rolling bearings, arranged axially behind each other, is fitted, that one end of the allowance communicates with the clearance opening while its opposite end is connected to a supply conduit for the plastics substance, so the latter, on its way towards the clearance opening, is forced to pass at least some of the rolling bearings and that means are provided to rotate the shaft and the housing in opposite directions.

The bearing structure preferably includes ball bearings of the angular-contact, or four-point contact type, lacking ball retaining cages. Means for rotating the components preferably comprises a power source rotating together with the outer component. The power source preferably acts upon a worm gear and a planeting gearing. The worm gear and the planetary gearing are advantageously mounted so at least part of the plastics substance will pass therethrough.

DESCRIPTION OF A PREFERRED EMBODIMENT

Figure 1:
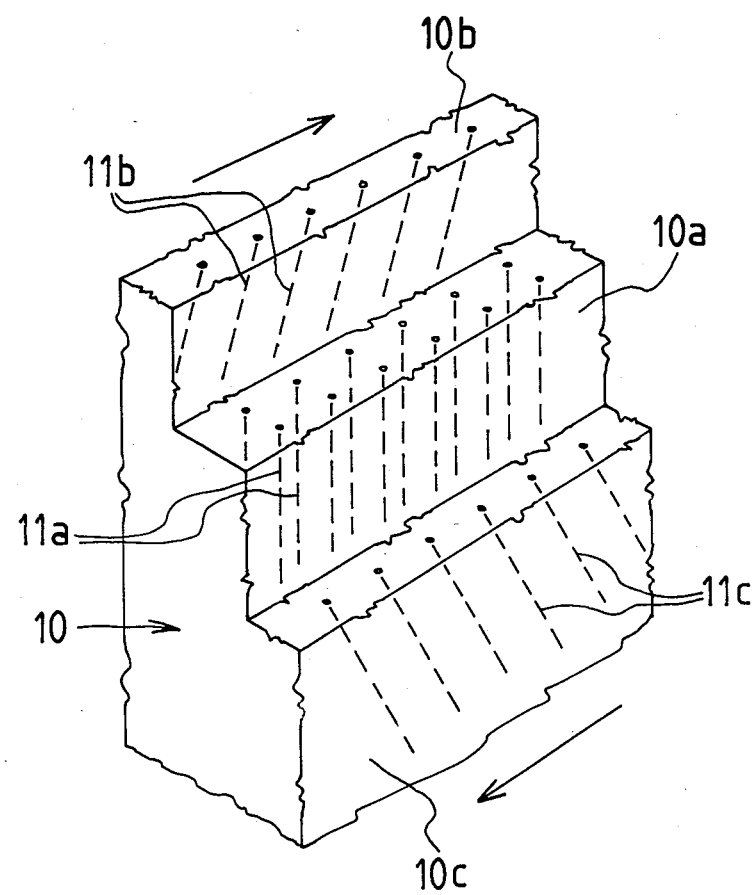
FIG. 1 very schematically shows the principle for orienting the molecular chains in a product produced according to the invention.

FIG. 1 very schematically shows how the molecular chains are oriented in a portion 10 of a plastic foil produced according to the invention. The figure does not claim to show correct dimension on the different strata, and upon the density and the length of the molecular chains, but only intend to illustrate the principle.

The foil is obtained by a tubular preform being forced out through the clearance opening between an inner component and outer component in a nozzle. Due to the high extrusion pressure and the friction along the walls defining the clearance opening the molecular chains will be oriented mainly in the direction of flow of the substance.

If now the inner and the outer components are rotated in opposite directions, the surface strata in the preform tend to follow the adjacent wall of the nozzle, which means that the molecular chains in those strata will be oriented in a bigger or smaller angle in relation to the direction of flow.

The foil 10 in FIG. 1 may be regarded as comprising a central stratum 10a, which remains unaffected by the slipping in the surface strata, 10b and 10c, respectively. In the central stratum the molecular chains 11a run in the direction of flow, whereas the molecular chains 11b and 11c, respectively in the surface strata 10b and 10c will deviate in the same direction as the adjacent orifice wall rotates.

In this manner a much stronger structure in the foil is obtained, than with conventional extrusion, and also a reduced risk of irregularities therein caused by local variations in the temperature and possible die-liners.

Figure 2:
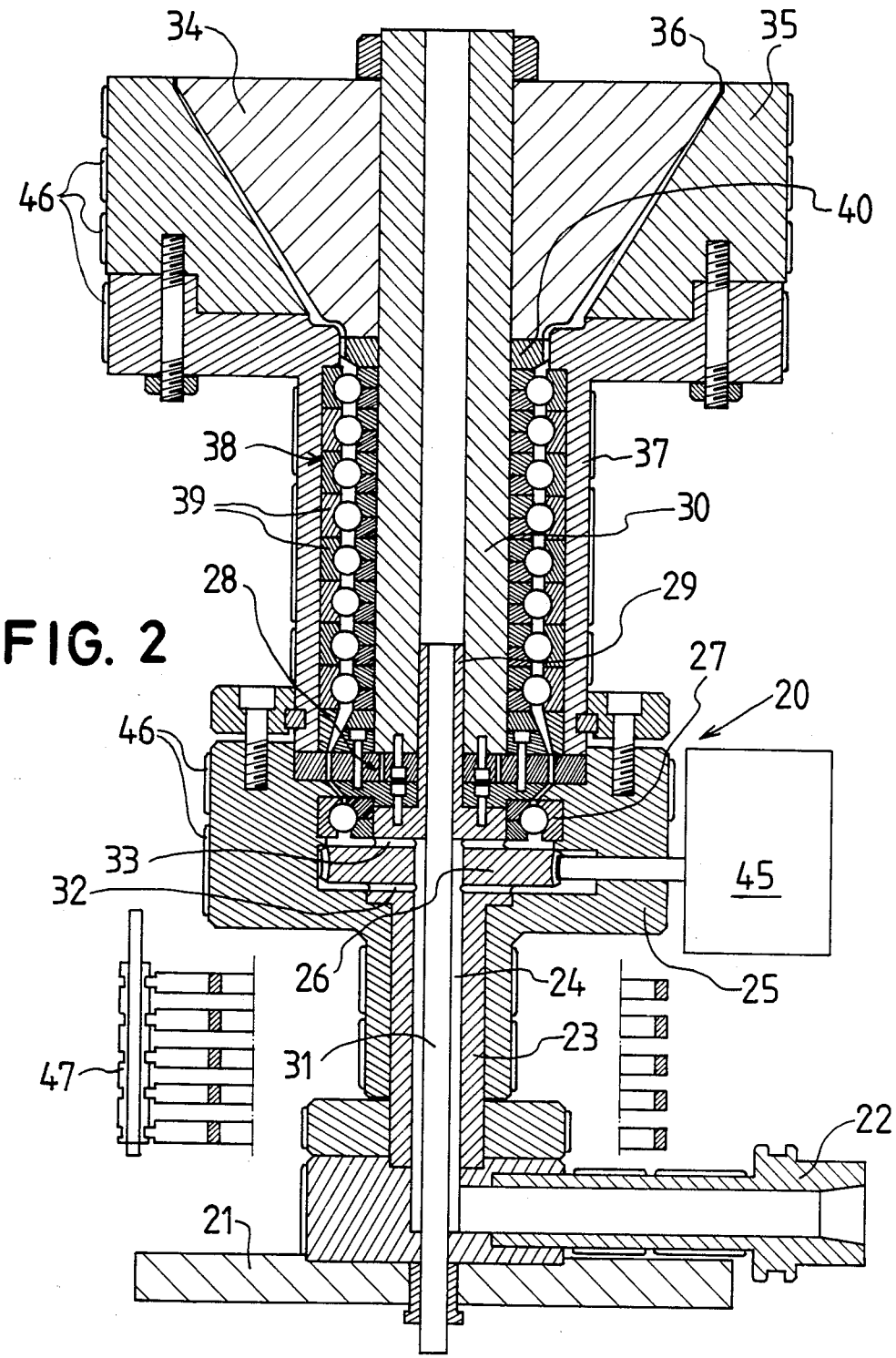
FIG. 2 shows an extruder nozzle for working the invention, and FIG. 3 on a larger scale shows the lower portion of the extruder nozzle according to FIG. 2.
Figure 3:
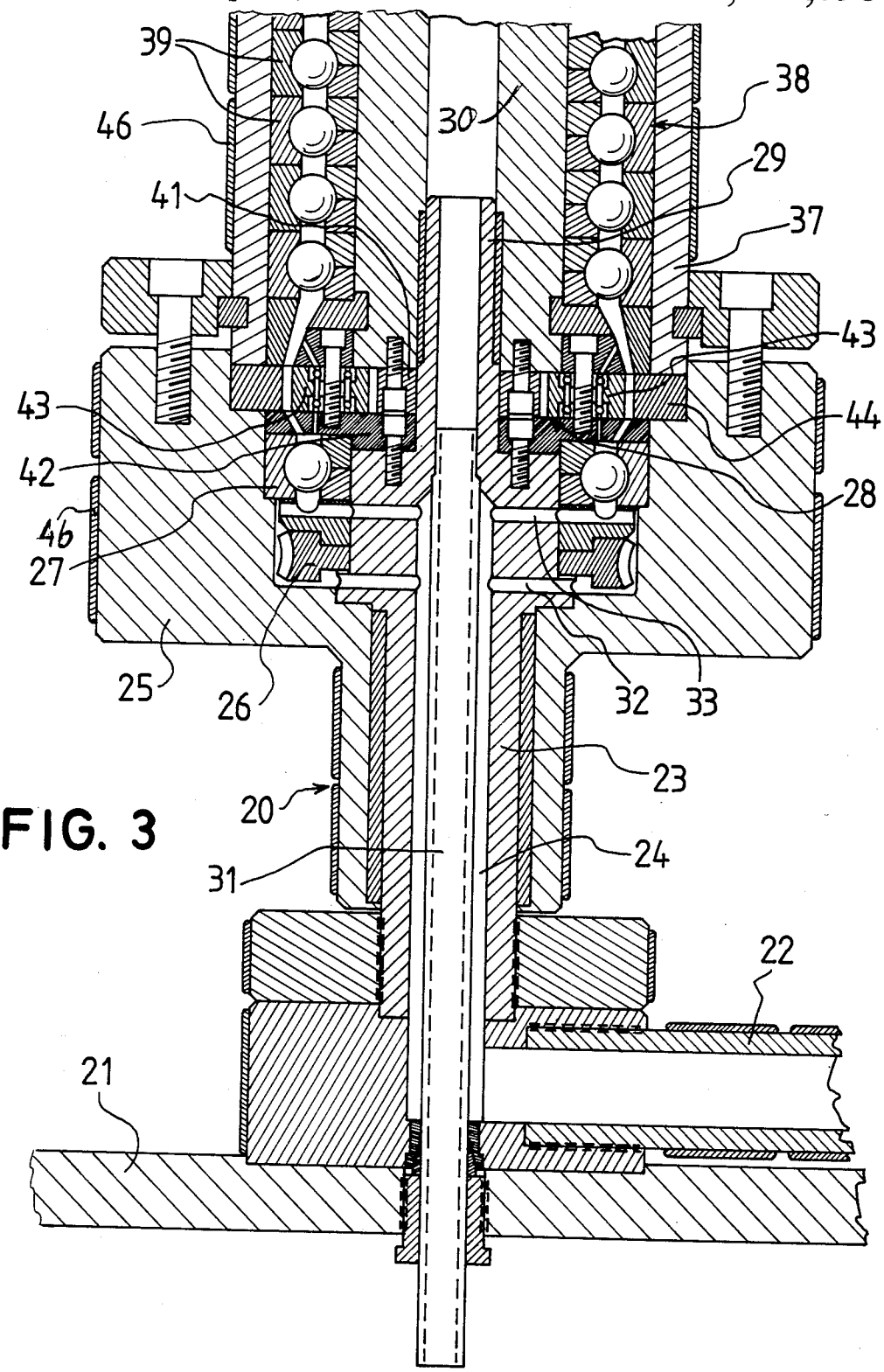

The nozzle 20 shown in FIG. 2 is intended for the production of plastics foil, which is obtained by expanding a tubular pre-form by means of compressed air. The nozzle is mounted with its central axis vertically, and the pre-form is extruded upwardly.

The nozzle 20 is mounted upon a base plate 21, and the molten plastics substance is introduced by way of a conduit 22, from an extruding machine (not shown), in which a screw member treats the base material so it is brought to molten state and is put under pressure.

A central column 23 is fixedly mounted upon the baseplate 21, and is provided with a passage 24, which communicates with the supply conduit, 22. The column 23 is partly enclosed by a rotatable housing 25, which contains a worm gear 26, a bearing 27 and a planetary gearing 28.

An extension 29 of the central column reaches into, and is journalled in a bore in a shaft 30. A pipe 31 extends through the passage 24 in the central column and communicates with the bore in shaft 30. The pipe 31 is connectable to a source of compressed air (not shown). The air supplied by way of this pipe makes it possible to blow up the tubular preform as it is extruded, so a desired thickness of the foil is obtained.

The plastic substance supplied is thus made to flow upwards through the central passage 24, around pipe 31, and passes, by way of radially directed bores 32, 33 out to the space in the housing 25, where the worm gear 26, the bearing 27, and the planetary gearing 28 are mounted. These components will hereby be efficiently lubricated.

The orifice of the nozzle comprises an inner component 34 and an outer component 35, which between themselves define a circular clearance opening 36. The inner component 34 has the form of a truncated cone, and the outer component 35 has an inner wall which substantially mates with the inner component. The enclosed passage towards the clearance opening will however taper as the diameter increases.

The inner component 34 is mounted upon the shaft 30 so as to rotate together therewith, and the outer component 35 is mounted in a tubular casing 37, which is rotatable about the shaft 30, being journalled in a bearing structure comprising a number of rolling bearings 39, arranged side by side.

The bearings 39 are, in the embodiment shown four-point-contact ball bearings of conventional type, where however the ball cages have been removed, and the races completely filled with balls. Angular-contact bearings, or roller bearings may however also be used. Beside the common bearing functions with respect to the rotating movement between the shaft 30 and the casing 37, and the taking care of the rather considerable axial loads which will occur in the tool in use, the balls will serve as kneading bodies for the plastics substance, which from the space in housing 25, by way of the planetary gearing 28, is made to pass the full length of the bearing structure 38 on its way to the clearance between the inner and the outer components of the nozzle.

The plastics substance will be homogenized during its passage through the bearing structure, and possible temperature variations will be evened out. Possible impurities in the substance are disintegrated by the kneading action and the residues dispersed so they will not cause any local weak spots in the foil. The elongate bearing structure furthermore ensures a fixation in the radial direction of the casing which maintains a uniform width of the clearance opening along the periphery thereof.

Plastics usually have favourable lubricating properties, and as the races are completely filled with balls the carrying capacity of the bearings is increased.

Between the bearing structure 38 and the entrance to the clearance between the inner and the outer components 34 and 35, a spreading device 40 is provided. This may include a washer provided with a number of holes, or having projections along its circumference. The spreading device 40 may be mounted so it rotates together with the shaft 30, or with the casing 37. This ensures an even distribution of the substance at the entrance to the orifice.

In order to obtain an efficient kneading within the bearing structure 38, and also to cause the action upon the molecular chains which is described in connection with FIG. 1, it is essential that the inner and the outer components of the nozzle rotate in opposite directions. The desired movement is obtained by means of the planetary gearing 28, the sun wheel 41 of which is mounted upon the shaft 30. A carrier 42 for a number of planetary wheels 43 is mounted upon the column 23, and a ring wheel 44 meshing with the planetary wheels is connected to the tubular bearing casing 37, as well as to housing 25.

The column 23 is rotated by the worm gear 26, which is driven by an electric motor 45, mounted upon the housing 25, and rotating together with the latter.

Electric current to the motor 45 as well as to a number of heating strips 46, which enclose diverse parts of the tool, is supplied by way of slip-ring devices 47, indicated in FIG. 2.

The details of the embodiment of the nozzle described above and shown in the drawings may be varied in many ways within the scope of the appended claims.

The number and the size of the kneading bodies 39 within the bearing structure 38 may be varied by selecting races with stepwisely varying diameters, or by using balls with different diameters, so different rolling velocities are obtained in different parts of the bearing structure. In the embodiment shown the bearing structure has a noticeable smaller diameter than the clearance opening 36, but variations concerning this size ratio may be called for, depending upon the size of the desired product.

What I claim is:

1. An extruder nozzle for producing a thin-walled tubular product from a pressurized plastics substance extruded through a circular clearance opening formed by a rotating outer component and a counter-rotating inner component, and including a shaft for mounting said inner component,
    a tubular casing for mounting said outer component and enclosing said shaft with an annular axial allowance,
    a bearing structure comprising a number of rolling bearings arranged axially behind each other within said annular allowance,
    a fixed central column with a conduit for supplying said pressurized plastics substance to said nozzle and communicating with the end of said annular allowance remote from said clearance opening,
    a connection passage between said clearance opening and the adjacent end of said annular allowance, whereby the plastics substance on its way to said clearance opening is forced to pass through at least some of said rolling bearings,
    a housing rotatably journaled on said central column and forming an extension of the casing mounting said outer component, and
    a power source mounted upon said housing and drivingly connected by gearing means enclosed in said housing for rotating said shaft and said casing together with said inner and outer components in opposite directions by means of planetary gears mounted on said central column.

2. An extruder nozzle according to claim 1 in which said bearing structure contains ball bearings where the balls completely fill outer and inner races in angular or four-point contact therewith without the aid of any retaining cages.

3. An extruder nozzle according to claim 1 or 2, in which said gearing means includes a worm gear and a planetary gearing operated thereby, and having power outputs to said shaft as well as to said casing.

4. An extruder nozzle according to claim 3, in which said supply conduit is connected to said housing, so at least part of the plastics substance will pass through said worm gear and said planetary gearing.

5. An extruder nozzle according to claim 1 further including a spreading device mounted in said communication passage downstream of said bearing structure and rotating together with either of the members carrying said inner and outer components.

6. An extruder nozzle according to claim 1, wherein said inner component is conical in shape and is disposed in a conical recess in said outer component, said conical recess having a slightly smaller angle than that of the inner component, whereby said clearance opening narrows from the inlet end to the outlet end thereof.

7. An extruder nozzle according to claim 1, further comprising an axial pipe passing through said central column and said shaft for blowing compressed air into said tubular product as it is extruded to obtain a desired wall thickness of said product.

* * * * *